United States Patent
Eshkenazi et al.

(10) Patent No.: US 10,120,997 B2
(45) Date of Patent: Nov. 6, 2018

(54) CODE INSTRUMENTATION FOR RUNTIME APPLICATION SELF-PROTECTION

(71) Applicant: CHECKMARX LTD., Ramat Gan (IL)

(72) Inventors: Shimon Eshkenazi, Bat Yam (IL); Maty Siman, Tel Aviv (IL); Alexander Roichman, Petach-Tikva (IL)

(73) Assignee: CHECKMARX LTD., Ramat Gan (IL)

( * ) Notice: Subject to any disclaimer, the term of this patent is extended or adjusted under 35 U.S.C. 154(b) by 0 days.

(21) Appl. No.: 15/535,732

(22) PCT Filed: Dec. 24, 2015

(86) PCT No.: PCT/IB2015/059981
§ 371 (c)(1),
(2) Date: Jun. 14, 2017

(87) PCT Pub. No.: WO2016/108162
PCT Pub. Date: Jul. 7, 2016

(65) Prior Publication Data
US 2018/0107821 A1    Apr. 19, 2018

Related U.S. Application Data

(60) Provisional application No. 62/099,160, filed on Jan. 1, 2015, provisional application No. 62/107,532, filed on Jan. 26, 2015.

(51) Int. Cl.
*G06F 21/51*    (2013.01)
*G06F 21/52*    (2013.01)
(Continued)

(52) U.S. Cl.
CPC .............. *G06F 21/51* (2013.01); *G06F 8/75* (2013.01); *G06F 9/328* (2013.01);
(Continued)

(58) Field of Classification Search
None
See application file for complete search history.

(56) References Cited

U.S. PATENT DOCUMENTS 7,237,265 B2    6/2007    Reshef et al.
7,392,545 B1    6/2008    Weber et al.
(Continued)

FOREIGN PATENT DOCUMENTS

| WO | 2008047351 A1 | 4/2008 |
| WO | 2016108162 A1 | 7/2016 |
| WO | 2016113663 A1 | 7/2016 |

OTHER PUBLICATIONS

International Application # PCT/IB2017/051321 Search Report dated Jun. 19, 2017.
(Continued)

*Primary Examiner* — Christopher A Revak
(74) *Attorney, Agent, or Firm* — D. Kligler IP Services Ltd.

(57) ABSTRACT

A method for runtime self-protection of an application program includes, before running the application program, identifying input and output points in runtime code (24) of the program. The input points are instrumented so as to cause the program to sense and cache potentially malicious inputs to the program. The output points are instrumented so as to cause the program to detect outputs from the program corresponding to the cached inputs. While running the application program, upon detecting, at an instrumented output point, an output corresponding to a cached input, a vulnerability of a target of the output to the cached input is evaluated. A protective action is invoked upon determining that the output is potentially vulnerable to the cached input.

37 Claims, 5 Drawing Sheets

(51) Int. Cl.
*G06F 8/75* (2018.01)
*G06F 9/32* (2018.01)
*G06F 9/445* (2018.01)
*G06F 21/12* (2013.01)

(52) U.S. Cl.
CPC .......... *G06F 9/44568* (2013.01); *G06F 21/52* (2013.01); *G06F 21/12* (2013.01)

(56) References Cited

U.S. PATENT DOCUMENTS

| | | | |
|---|---|---|---|
| 7,647,631 B2 | 1/2010 | Sima | |
| 8,819,772 B2* | 8/2014 | Bettini | H04L 63/0245 709/219 |
| 8,844,043 B2 | 9/2014 | Williams et al. | |
| 9,317,399 B2 | 4/2016 | Boshernitsan et al. | |
| 9,882,930 B2* | 1/2018 | Holt | H04L 63/1466 |
| 9,946,880 B2* | 4/2018 | Lee | G06F 21/577 |
| 2004/0205411 A1 | 10/2004 | Hong et al. | |
| 2005/0257207 A1 | 11/2005 | Blumfield et al. | |
| 2007/0044153 A1 | 2/2007 | Schuba et al. | |
| 2007/0074169 A1 | 3/2007 | Chess et al. | |
| 2009/0019545 A1 | 1/2009 | Ben-Itzhak et al. | |
| 2009/0113550 A1* | 4/2009 | Costa | G06F 21/52 726/25 |
| 2009/0300764 A1 | 12/2009 | Freeman | |
| 2010/0058475 A1* | 3/2010 | Thummalapenta | G06F 21/577 726/25 |
| 2010/0125913 A1 | 5/2010 | Davenport et al. | |
| 2011/0030061 A1 | 2/2011 | Artzi et al. | |
| 2011/0034733 A1 | 2/2011 | Funahashi et al. | |
| 2012/0167209 A1 | 6/2012 | Molnar et al. | |
| 2013/0019314 A1 | 1/2013 | Ji et al. | |
| 2013/0024942 A1* | 1/2013 | Wiegenstein | G06F 11/3604 726/25 |
| 2013/0247198 A1 | 9/2013 | Muttik et al. | |
| 2013/0312102 A1* | 11/2013 | Brake | G06F 21/577 726/25 |
| 2014/0165204 A1 | 6/2014 | Williams et al. | |
| 2014/0281740 A1* | 9/2014 | Casado | G06F 11/3409 714/47.2 |
| 2014/0331327 A1 | 11/2014 | Maor et al. | |
| 2014/0372985 A1 | 12/2014 | Levin et al. | |

OTHER PUBLICATIONS

International Application # PCT/IB2015/059981 dated May 8, 2016.
International Application # PCT/IB2016/050106 dated Mar. 31, 2016.
Coverity Inc., "Coverity® Development Testing Platform", 5 pages, year 2012.
Chess et al., "Dynamic Taint Propagation", 70 pages, Feb. 21, 2008.
Microsoft, "Servie.MapPath Method", IIS 6.0, 2 pages, year 2012.
Microsoft, "Reflection in the .NET Framework", 2 pages, May 1, 2013.
Microsoft, "Path.GetFullPath Method", 3 pages, year 2012.
Mono Project, "Mono.Cecil", 5 pages, Oct. 2, 2014.
Icrosoft, "API and Reference Catalog", 2 pages, Nov. 28, 2014.
Microsoft, "HttpServerUtility.MapPath Method (String)", 2 pages, year 2012.
Desalaworks, "How to obtain SOAP Request body in C#Web", 4 pages, Nov. 5, 2014.
Strahl, R., "Capturing and Transforming ASP.NETs Output with Response.Filter", 14 pages, Nov. 13, 2009.
European Application # 15875340.0 search report dated Apr. 3, 2018.
European Application # 16737140.0 search report dated May 15, 2018.
Balzarotti et al., "Saner: Composing Static and Dynamic Analysis to Validate Sanitization in Web Applications", IEEE Symposium on Security and Privacy, pp. 387-401, May 18, 2018.
EP Application # 18171274.6 Search report dated Jun. 28, 2018.

* cited by examiner

CODE INSTRUMENTATION FOR RUNTIME APPLICATION SELF-PROTECTION

CROSS-REFERENCE TO RELATED APPLICATION

This application claims the benefit of U.S. Provisional Patent Application 62/099,160, filed Jan. 1, 2015, and U.S. Provisional Patent Application 62/107,532, filed Jan. 26, 2015, which are both incorporated herein by reference.

FIELD OF THE INVENTION

The present invention relates generally to protecting against security vulnerabilities in computer programs, and specifically to runtime application self-protection (RASP).

BACKGROUND

RASP techniques are used to protect software applications against security vulnerabilities by adding protection features into the application. In typical RASP implementations, these protection features are instrumented into the application runtime environment, for example by making appropriate changes and additions to the application code and/or operating platform. The instrumentation is designed to detect suspicious behavior during execution of the application and to initiate protective action when such behavior is detected.

RASP is thus different from, and may be complementary to, static application security testing (SAST) and dynamic application security testing (DAST). SAST techniques are typically applied in order to detect security vulnerabilities before the code is compiled and run. DAST approaches the application as a "black box," and attempts to find vulnerabilities by bombarding the application during runtime with potentially harmful inputs.

SUMMARY

Embodiments of the present invention that are described hereinbelow provide improved methods, systems and software for protecting software programs against security vulnerabilities.

There is therefore provided, in accordance with an embodiment of the invention, a method for runtime self-protection of an application program. The method includes, before running the application program, identifying input and output points in runtime code of the program. The input points are instrumented so as to cause the program to sense and cache potentially malicious inputs to the program. The output points are instrumented so as to cause the program to detect outputs from the program corresponding to the cached inputs. While running the application program, upon detecting, at an instrumented output point, an output corresponding to a cached input, a vulnerability of a target of the output to the cached input is evaluated. A protective action is invoked upon determining that the output is potentially vulnerable to the cached input.

In the disclosed embodiments, instrumenting the input points includes adding a sensor routine to each identified input point, wherein the sensor routine examines the input for syntax that is characteristic of an attack pattern. In one embodiment, the attack pattern is selected from a set of attack patterns consisting of SQL injection, cross-site scripting (XSS), file path manipulation, and JavaScript Object Notation (JSON) injection.

Additionally or alternatively, identifying the output points includes identifying instructions submitted by the application program to a predefined set of targets. In a disclosed embodiment, the set of targets includes at least one target type selected from a group of target types consisting of databases, file systems and markup language outputs of Web applications.

In one embodiment, identifying the input and output points includes applying a static analysis to source code of the program in order to identify one or more of the input and output points. Additionally or alternatively, identifying the input points includes identifying an encoded input to the application program, and the method includes identifying and instrumenting a decoding point in the runtime code, at which the encoded input is decoded, so as to cause the program to cache the decoded input for detection of the outputs corresponding thereto.

In a disclosed embodiment, instrumenting the input and output points includes replacing input and output methods in the runtime code with a general method RASP proxy, which wraps the methods.

In one embodiment, detecting the output includes finding an approximate match between the cached input and data contained in the output. Additionally or alternatively, detecting the output includes detecting a file-path parameter in the cached input, and evaluating the vulnerability includes converting the file-path parameter to a canonical form, and identifying a file system vulnerability when the canonical form does not match a file-path prefix of the output.

In some embodiments, evaluating the vulnerability includes parsing the output into a document object model (DOM), and examining an effect of the cached input on the DOM. In a disclosed embodiment, examining the effect includes determining that the output is potentially vulnerable when the cached input extends over more than a single leaf of the DOM. Additionally or alternatively, examining the effect includes detecting an executable script in the DOM that contains the cached input.

Typically, the method includes, upon determining that the output is not vulnerable to the cached input, taking no protective action.

In some embodiments, invoking the protective action includes sanitizing the cached input before permitting the output to proceed. Additionally or alternatively, invoking the protective action includes reporting the vulnerability to a user together with a stack trace associated with at least one of the cached input and the detected output. Further additionally or alternatively, invoking the protective action includes identifying a portion of the source code corresponding to the output that was determined to be potentially vulnerable. In another embodiment, invoking the protective action includes automatically generating rules for implementation by a Web Application Firewall (WAF).

There is also provided, in accordance with an embodiment of the invention, a method for runtime self-protection of an application program. The method includes, before running the application program, instrumenting the program so as to sense a potentially malicious input to the program and to detect an output from the program corresponding to the input. Upon detecting the output while running the program, the output is parsed to generate a document object model (DOM) that contains the input. A protective action is invoked upon determining that the input extends over more than a single leaf of the DOM.

In a disclosed embodiment, the output includes a structured query language (SQL) statement. Additionally or alternatively, when the application program includes a Web application, the output may include a markup language command, which is generated by the Web application.

There is additionally provided, in accordance with an embodiment of the invention, a method for runtime self-protection of an application program. The method includes applying a static analysis to source code of the application program and identifying, based on the static analysis, one or more points in the application program to be instrumented with logic for runtime self-protection. The source code is compiled to generate executable code. Before running the application program, the executable code is instrumented at the identified points with the logic for runtime self-protection. While running the application program, malicious activity is detected using the instrumented logic.

In some embodiments, identifying the one or more points includes identifying input and output points in the source code. In a disclosed embodiment, identifying the input points includes identifying an encoded input to the application program, and identifying the one or more points includes identifying a decoding point in the source code, at which the encoded input is decoded. Additionally or alternatively, identifying the input and output points includes recognizing the input and output points of an application program interface (API) that is used in the application program, and instrumenting the executable code includes instrumenting multiple instance of the API based on the input and output points recognized by the static analysis.

In another embodiment, applying the static analysis includes applying static application security testing (SAST) to the source code, and identifying the one or more points includes identifying, using the SAST, a part of the source code containing a security vulnerability, and instrumenting the executable code includes adding instrumentation in a section of the executable code that corresponds to the identified part of the source code.

In a disclosed embodiment, identifying the one or more points includes submitting a query to a static code analysis engine to identify specified input and output points in the source code based on the static analysis.

There is further provided, in accordance with an embodiment of the invention, a method for testing an application program, which includes instrumenting selected points in runtime code of the program so as to cause the program to output, at the selected points, information indicative of runtime behavior of the program. The program is run, and the information output at the selected points is recorded. A static analysis of a flow of the program is performed using source code of the program together with the recorded information.

In a disclosed embodiment, instrumenting the selected points includes instrumenting function calls in the runtime code so as to cause the program to output function call flow information for use in performing the static analysis.

There is moreover provided, in accordance with an embodiment of the invention, a method for testing an application program, which includes instrumenting selected points in runtime code of the program so as to cause the program to output, at the selected points, information indicative of potential vulnerabilities in the program. The program is run, and the information output at the selected points is recorded. A dynamic application security testing (DAST) tool is applied to evaluate the vulnerabilities using the recorded information.

There is furthermore provided, in accordance with an embodiment of the invention, apparatus for runtime self-protection of an application program, including a memory, which is configured to receive runtime code of the program. A processor is configured to identify, before the program is run, input and output points in the runtime code, to instrument the input points so as to cause the program, while the program is running, to sense and cache potentially malicious inputs to the program, and to instrument the output points with instrumentation that causes the program, while the program is running, to detect outputs from the program corresponding to the cached inputs, and upon detecting an output corresponding to a cached input, to evaluate a vulnerability of a target of the output to the cached input and to invoke protective action upon determining that the output is potentially vulnerable to the cached input.

There is also provided, in accordance with an embodiment of the invention, apparatus for runtime self-protection of an application program, including a memory, which is configured to receive runtime code of the program. A processor is configured to instrument the program, before the program is run, so as to cause the program, while the program is running, to sense a potentially malicious input to the program and to detect an output from the program corresponding to the input, and to cause the program, upon detecting the output while the program is running, to parse the output to generate a DOM that contains the input and to invoke a protective action upon determining that the input extends over more than a single leaf of the DOM.

There is additionally provided, in accordance with an embodiment of the invention, apparatus for runtime self-protection of an application program, including a memory, which is configured to receive source code of the application program. A processor is configured to apply a static analysis to the source code, to identify, based on the static analysis, one or more points in the application program to be instrumented with logic for runtime self-protection, to compile the source code to generate executable code, and before running the application program, to instrument the executable code at the identified points with the logic for runtime self-protection, which causes the program to detect malicious activity while running the application program.

There is further provided, in accordance with an embodiment of the invention, apparatus for testing an application program, including a memory, which is configured to receive runtime code and source code of the program. A processor is configured to instrument selected points in the runtime code of the program so as to cause the program to output, at the selected points, information indicative of runtime behavior of the program, and is configured to run the program and record the information output at the selected points, and to perform a static analysis of a flow of the program using the source code of the program together with the recorded information.

There is moreover provided, in accordance with an embodiment of the invention, apparatus for testing an application program, including a memory, which is configured to receive runtime code of the program. A processor is configured to instrument selected points in the runtime code so as to cause the program to output, at the selected points, information indicative of potential vulnerabilities in the program, and is configured to run the program and record the information output at the selected points, and to apply a dynamic application security testing (DAST) tool to evaluate the vulnerabilities using the recorded information.

There is furthermore provided, in accordance with an embodiment of the invention, a computer software product for runtime self-protection of an application program, including a computer-readable medium in which program instructions are stored, which instructions, when read by a computer, cause the computer to receive runtime code of the program, and to identify, before the program is run, input and output points in the runtime code, and to instrument the input points so as to cause the program, while the program is running, to sense and cache potentially malicious inputs to the program, and to instrument the output points with instrumentation that causes the program, while the program is running, to detect outputs from the program corresponding to the cached inputs, and causes the program, upon detecting an output corresponding to a cached input, to evaluate a vulnerability of a target of the output to the cached input and to invoke protective action upon determining that the output is potentially vulnerable to the cached input.

There is also provided, in accordance with an embodiment of the invention, a computer software product for runtime self-protection of an application program, including a computer-readable medium in which program instructions are stored, which instructions, when read by a computer, cause the computer to receive runtime code of the program, and to instrument the program, before the program is run, so as to cause the program, while the program is running, to sense a potentially malicious input to the program and to detect an output from the program corresponding to the input, and to cause the program, upon detecting the output while the program is running, to parse the output to generate a DOM that contains the input and to invoke a protective action upon determining that the input extends over more than a single leaf of the DOM.

There is additionally provided, in accordance with an embodiment of the invention, a computer software product for runtime self-protection of an application program, including a computer-readable medium in which program instructions are stored, which instructions, when read by a computer, cause the computer to receive source code of the application program and to apply a static analysis to the source code so as to identify, based on the static analysis, one or more points in the application program to be instrumented with logic for runtime self-protection, and to compile the source code to generate executable code, and before running the application program, to instrument the executable code at the identified points with the logic for runtime self-protection, which causes the program to detect malicious activity while running the application program.

There is further provided, in accordance with an embodiment of the invention, a computer software product for testing an application program, including a computer-readable medium in which program instructions are stored, which instructions, when read by a computer, cause the computer to receive runtime code and source code of the program, and to instrument selected points in the runtime code of the program so as to cause the program to output, at the selected points, information indicative of runtime behavior of the program, and to run the program and record the information output at the selected points, and to perform a static analysis of a flow of the program using the source code of the program together with the recorded information.

There is moreover provided, in accordance with an embodiment of the invention, a computer software product for testing an application program, including a computer-readable medium in which program instructions are stored, which instructions, when read by a computer, cause the computer to receive runtime code of the program, and to instrument selected points in the runtime code so as to cause the program to output, at the selected points, information indicative of potential vulnerabilities in the program, and to run the program and record the information output at the selected points, and to apply a dynamic application security testing (DAST) tool to evaluate the vulnerabilities using the recorded information.

The present invention will be more fully understood from the following detailed description of the embodiments thereof, taken together with the drawings in which:

DETAILED DESCRIPTION OF EMBODIMENTS

Overview

Figure 1:
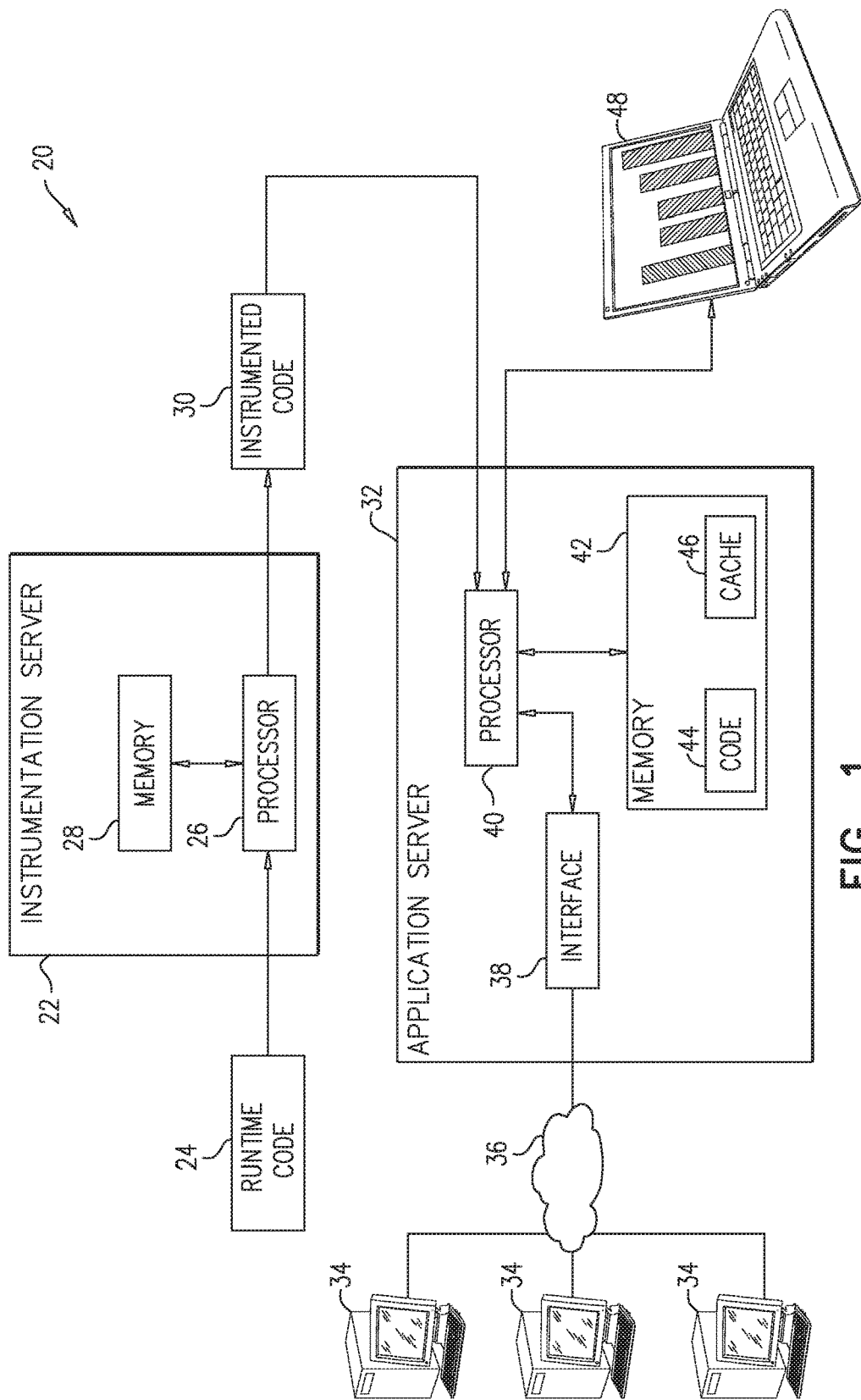
FIG. 1 is a block diagram that schematically illustrates a system for secure operation of a software application, in accordance with an embodiment of the invention.

Existing RASP solutions suffer from problems of high overhead and high false alarm rates (also referred to as "false positives" or FP). Some embodiments of the present invention that are described herein address these problems by providing RASP instrumentation that is targeted at two specific points in the program flow:
1) Inputs at which the program receives data from users or other data sources; and
2) Outputs at which the program submits queries or other instructions to sensitive targets, such as databases or file systems, or HTML outputs of Web applications.

In the disclosed embodiments, instrumentation is typically added at only these two points in each program flow, resulting in low overhead.

During runtime, the instrumented application gets inputs and creates outputs as part of its regular workflow. Each input that arrives at an instrumented input (source) point is checked by one or more vulnerability sensors, which examine the input for syntax that is characteristic of attack patterns, such as SQL injection, cross-site scripting (XSS), file path manipulation, and/or JavaScript Object Notation (JSON) injection. Matching of regular expressions may be used for this purpose. When an input is identified as potentially malicious by one of these sensors, it is saved in a cache for a certain period of time (for example, one minute) or until the cache is full. (Both cache capacity and saving time duration are configurable.) For each saved input, the cache also holds a flag indicating the vulnerabilities to which the input may be relevant, along with other pertinent metadata (such as time, stack-trace, and context). Aside from caching the suspicious input, the application workflow continues without interruption.

When the application workflow arrives at an instrumented output, the cache of recent inputs is checked again by vulnerability detectors that are applicable to the specific target of the output. For example, an SQL injection detector may be invoked for database targets, an XSS detector for HTML outputs, and/or a file manipulation detector for file-system APIs. Depending on the type of target, the detector applies appropriate detection logic to the relevant cached inputs in order to detect potentially harmful patterns using detection logic that is appropriate for the target. When the logic finds an input that matches the detection criteria for the current target, an alert is raised, and other preventive action may be taken, as well, such as blocking or cleansing the input or even halting the application entirely. If the context of the flow from the input to the output is known, relevant malicious inputs found by the vulnerability sensors are passed only to the appropriate detectors for the relevant targets.

Because RASP instrumentation is applied in the present embodiments at two points (input source/sensor and output target/detector), no alert will be raised when an input that appears malicious reaches a target that is not vulnerable to it. In this manner, false positives are avoided. On the other hand, because the instrumentation is applied at only two points per workflow from input to output, the overhead is minimized (typically to less than 0.5%), and most of the application flow is not affected at all. Only the necessary RASP logic is activated at the target level, and only for the relevant inputs (as indicated by the sensors), leaving the normal workflow of valid inputs and outputs unaffected.

Another challenge in RASP testing is to distinguish automatically between outputs that are actually harmful and those that are benign. If the type of an output is known (for example, SQL or HTML) and has a well-defined structure, it is possible to write a program that will parse the output and recognize deviations from the valid structure. This sort of analysis, however, requires exhaustive preparations in order to define the expected valid structures for all outputs (for example, all valid SQL structures).

To simplify detection of malicious outputs, some embodiments of the present invention parse outputs into a document object model (DOM) and examine how the parsing is affected by inputs appearing in these outputs. Valid inputs within the output, when parsed in this manner, should occupy only a single leaf of the DOM. An input that is found to extend over two or more leaves "breaks" the DOM and is treated as suspicious. This generic approach enables the RASP logic to detect suspicious outputs without requiring specific definitions of valid output structures to be made for each output. The suspicious outputs that are detected in this manner are correlated with the inputs responsible for the suspicious behavior.

In other embodiments, SAST analysis is used in enhancing RASP instrumentation. SAST techniques, such as source code analysis, are capable of detecting input and output points, as well as other vulnerable points within the flow of a program. These points may be matched to the corresponding points in the runtime code of the program, and RASP instrumentation may be added at the corresponding points in order to improve RASP coverage and increase the chances of detecting attempts to exploit vulnerabilities in the program.

As another example, runtime inputs to an application are frequently encoded, making it difficult to match these inputs to outputs in two-point RASP. In one embodiment of the present invention, SAST is used to trace the flow of data from a given encoded input to identify the point in the program at which the input is decoded. RASP instrumentation is then added at this point in order to capture the decoded input for subsequent matching to program outputs. Alternatively or additionally, encoding and decoding operations may be identified in the assembly code and instrumented for RASP without relying on SAST.

In other embodiments, the results of RASP instrumentation are used in enhancing other security testing and protection techniques. For example:

Points of vulnerability detected in RASP analysis may be linked to the actual vulnerable code in a SAST report or may be used in automatically generating rules for implementation by a Web Application Firewall (WAF).

In some embodiments, RASP instrumentation is used to extract information regarding runtime behavior of a program that cannot readily be derived by static analysis. For example, function calls in the program may be instrumented with RASP logic that identifies dependencies between methods, which may then be applied in building the call graph of the program. This dependency information may be provided to a SAST tool, for example, in order to enable the SAST tool to derive a more accurate and complete analysis of control flow and data flow in the program, including flows that could not be found by static analysis alone.

In other embodiments, RASP is used in conjunction with DAST. For example, two-point RASP may be applied in order to recognize hidden vulnerabilities that are provoked by the inputs generated by a DAST tool.

The techniques described above may be used effectively in various combinations, with one another and with other techniques that are known in the art, in order to enhance detection of vulnerabilities in software code. Such combinations will be apparent to those skilled in the art after reading the present description. Alternative, many of the above techniques may be used independently of the others. Each of the techniques by itself and all such combinations of these techniques are considered to be within the scope of the present invention.

System Description

FIG. 1 is a block diagram that schematically illustrates a system 20 for secure operation of a software application, in accordance with an embodiment of the invention. System 20 is shown and described here, for the sake of concreteness and clarity, as an example of an operating environment in which the present techniques of code instrumentation and vulnerability detection can be implemented. Alternatively, these techniques may be implemented, mutatis mutandis, in substantially any computing environment with suitable computational resources and interfaces.

An instrumentation server 22 receives runtime code 24 of an application that is to be protected against security vulnerabilities. Server 22 is typically a general-purpose computer, comprising a processor 26 and a memory 28, as well as other conventional computing resources, and is programmed in software to carry out the code analysis and instrumentation functions that are described herein. This software may be downloaded to server 22 in electronic form, over a network, for example. Additionally or alternatively, the code may be stored on tangible, non-transitory computer-readable media, such as optical, magnetic, or electronic memory media.

In the present embodiment, instrumentation server 22 receives runtime code 24 into memory 28, applies RASP instrumentation to the runtime code 24, and thus outputs instrumented code 30 to an application server 32, which is to run the code. In the pictured scenario, server 32 communicates with client computers 34 over a network 36, such as the Internet, via a network interface 38. Client computers 34 request and receive services of the application from server 32, such as Web pages and/or responses to database queries. In some cases, however, one or more of client computers 34 may submit malicious inputs to server 32 in an attempt to discover and exploit security vulnerabilities.

For example, as described in greater detail hereinbelow, processor 26 typically identifies input and output points in runtime code 24. Processor 26 instruments the input points so as to cause the program to sense and cache potentially malicious inputs to the program, and instruments the output points so as to cause the program to detect outputs from the program corresponding to the cached inputs.

In addition to the RASP instrumentation functions that are described here in detail, server 22 may also be programmed to carry out other sorts of analysis of source code and/or executable code, such as SAST and/or DAST. For example, in one embodiment, processor 26 applies static analysis to source code of the application program in order to identify points in the program to be instrumented with RASP logic. Server 22 (or another computer) compiles the source code to generate executable code and instruments the executable code at the identified points with the appropriate RASP logic.

Application server 32, like instrumentation server 22, is typically a general-purpose computer (and in some scenarios, some or all of the functions of server 22 may be implemented in server 32, rather than in a separate machine as shown in FIG. 1). Server 32 comprises a processor 40 and a memory 42, including a code memory area 44, which holds instrumented code 30, as well as protective routines that may be invoked by the instrumentation in the code. For example, as explained in detail hereinbelow, while processor 40 runs the application program, it places information gathered by the instrumentation at input points during runtime a cache area 46 in memory 42. Upon detecting an output corresponding to a cached input, processor 40 evaluates the vulnerability of the target of the output to the cached input.

Based on analysis of the information provided by the code instrumentation, processor 40 invokes protective action upon detecting a possible attack. Typically, this protective action includes, at a minimum, writing alerts to a log file, which may then be viewed by the system operator via a suitable user interface (also referred to as a "dashboard") on a user terminal 48, which reads the log file automatically. (A dashboard of this sort in shown in FIG. 5, while a sample log file is listed hereinbelow in Appendix A.) Alternatively or additionally, the instrumentation may cause the application to pass the inputs and outputs to a separate program or server for analysis and alert generation. Further additionally or alternatively, protective actions taken by processor 40 may include interrupting service to a client computer 34 that has submitted a malicious input or possible shutting down the application entirely in extreme cases.

Like server 22, application server 32 is programmed in software to carry out the functions of detecting and protecting against vulnerabilities that are described herein. This software may be downloaded to server 32 in electronic form, over a network, for example. Additionally or alternatively, the code may be stored on tangible, non-transitory computer-readable media, such as optical, magnetic, or electronic memory media.

Instrumentation Techniques

Figure 2A:
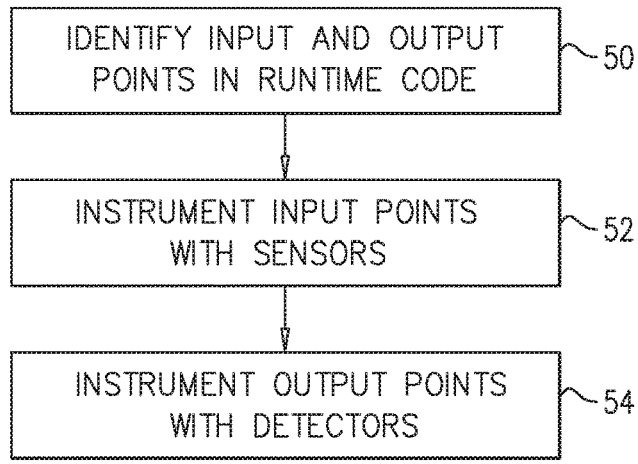
FIG. 2A is a flow chart that schematically illustrates a method for software code instrumentation, in accordance with an embodiment of the invention.

FIG. 2A is a flow chart that schematically illustrates a method for software code instrumentation, in accordance with an embodiment of the invention. The method is described, for clarity and convenience, with reference to instrumentation server 22, although it may alternatively be carried out by application server 32 or in another computing configuration.

For purposes of instrumentation, processor 26 converts executable runtime code 24, for example, to Common Intermediate Language (CIL) code by the Mono.Cecil software library, or to another assembly format. Only the program assembly code is needed for purposes of instrumentation, not the source code. After instrumentation has been completed (as described below), the program code is restored to executable form and runs in the normal manner, with the addition of the instrumented methods.

Processor 26 reviews the assembly code in order to identify input and output points for instrumentation, at an input/output identification step 50. The instrumentation of the program is performed, in embodiments of the present invention, by a "patcher" software tool, which identifies potential attack sources (program inputs) and attack targets (at program outputs) in the assembly code, and adds instrumentation at these points. These points may include the following, for example:

Inputs/Sources:
  User inputs entered as text (textboxes) in both desktop and Web applications.
  Web application Http Request and Query String parameters.
  Web service parameters.
    Data in JavaScript Object Notation (JSON) format transferred by Web services is also considered as an input, with each node of the JSON data regarded as a separate input (split, for example, by an open-source JSON Parser library).
Outputs/Targets:
  HTML output of Web application.
  Database (DB) application program interfaces (APIs), for example of OleDB, SQLite, and/or MySQL.
  File System APIs.

An XML listing of instrumentation methods is attached hereto as Appendix B, which is incorporated herein as an integral part of the present patent application. Analysis of inputs and outputs can be performed using open-source parsing programs that are publicly available, such as HTML, JSON, and SQL format parsers.

The above examples and the listing below are not exhaustive, however, and the set of instrumentation methods may be extended and customized to include other protection points without changing the basic operation of the patcher.

In order to invoke the appropriate sensing and detection operations at the identified inputs and outputs, processor 26 instruments input points with sensor routines, at an input instrumentation step 52, and instruments output points with detector routines, at an output instrumentation step 54. For this purpose, in the present embodiment, the patcher replaces all instrumentation points with a single general-method proxy. At runtime, this proxy causes the appropriate method to be run at each instrumentation point according to its class context and original method name. (In the .NET framework, the Reflection classes may be used for this purpose, as described in documentation available from Microsoft.) Using this approach, there is no need to provide a specific proxy for each method, and instrumentation points can be added without code changes in the overall RASP framework.

As an example, assume the original application code (before instrumentation) gets a user input from a text box using the following CIL line:
callvirt instance string [System.Web]System.Web.UI.Web-Controls.TextBox::get_Text( )
The string "System.Web.UI.WebControls.TextBox::get_Text( )" is identified as a user input according to the predefined list of inputs (sources) and outputs (targets) mentioned above.

The patcher replace this line with a call to a RASP proxy method, which wraps the input and protects it (with the original method name set as a field of this general method proxy), as can be seen in the following example CIL code:
ldstr "System.String System.Web.UI.WebControls.TextBox::g"+"et_Text( )|0"
stsfld string [Runtime]Runtime.Proxies.GeneralMethodProxy::InstrumentationDetails
call object [Runtime]Runtime.Proxies.GeneralMethodProxy::Stub(object)
Database access methods are replaced by this sort of protected proxy in a similar manner.

There are some exceptions to this methodology for specific types of inputs and outputs, for example:
Web page outputs (with HTML that may be vulnerable to XSS) are instrumented by adding the following line in each initialization of a web page:
call void [Runtime]Runtime.Proxies.
 GeneralMethodProxy::WebPageDetect(object)
The WebPageDetect method invoked in the above code captures the Web page output using a technique based on HttpResponse.Filter, which is available as part of the Microsoft .NET framework and is described on the Microsoft Developer Network (msdn) Web site.
Web service methods (which are recognizable by a Web service attribute in the CIL code), with the method parameters considered as inputs, are instrumented by adding the following line at the start of each Web service method, in order to capture all the inputs and parameters of each Web service request:
call void [Runtime]Runtime.Proxies.
 GeneralMethodProxy::GeneralSanitize( . . . )
The GeneralSanitize method invoked in the above code captures the Web service request using an EchoSoapRequest technique that is provided in the .NET framework. Such techniques are described in an article by Steven de Salas, entitled "How to obtain SOAP Request body in C# Web Services," available on the desalasworks.com Web site.

For more efficient operation, the patcher may be configured to ignore certain parts of a program. For example, certain URIs (or URI patterns, which may be defined by regular expressions) may be included in a "blacklist" for instrumentation purposes. All workflows in these parts of the program (inputs, requests, and outputs) will remain as is without instrumentation.

Alternatively or additionally, the patcher can be configured to work only on specific parts of a program (defined by a "whitelist") that are considered to be vulnerable. Such vulnerabilities may be identified, for example, by SAST of the corresponding source code. In this case, the rest of the application will work as is without instrumentation. The whitelist may be generated automatically by the patcher based on SAST results. The use of SAST in identifying points for instrumentation is described further hereinbelow with reference to FIG. 3.

Analysis and Detection of Vulnerabilities

Figure 2B:
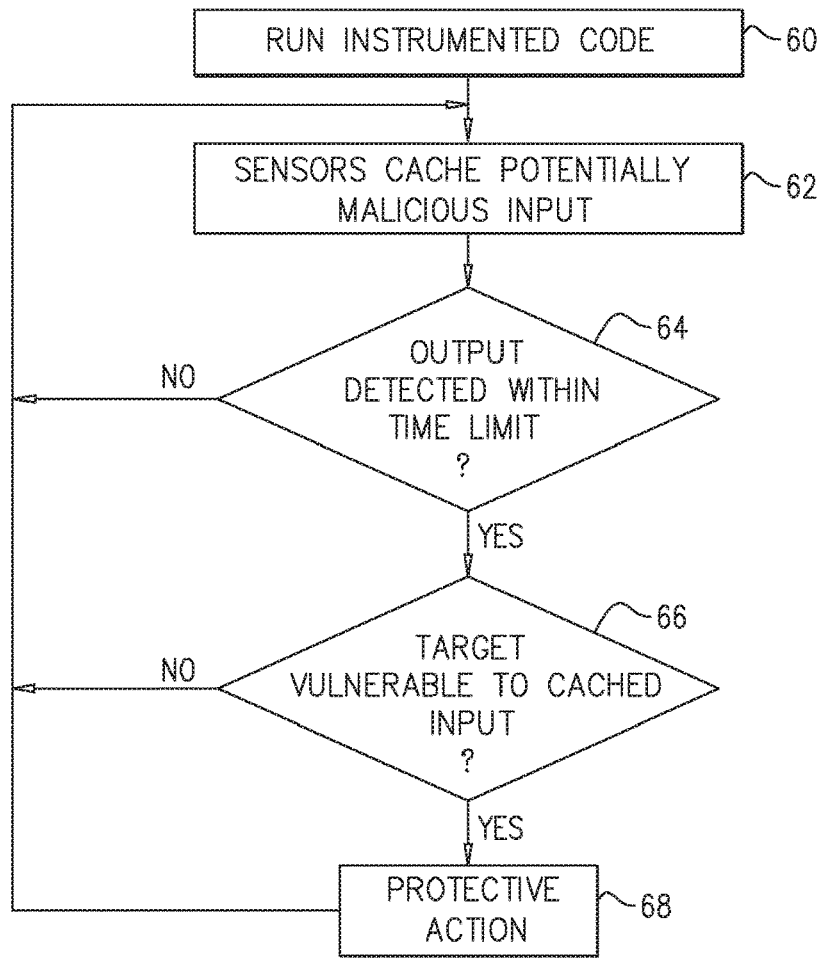
FIG. 2B is a flow chart that schematically illustrates a method for protecting a software application at runtime, in accordance with an embodiment of the invention.

FIG. 2B is a flow chart that schematically illustrates a method for protecting a software application at runtime, in accordance with an embodiment of the invention. In the present description, this method is assumed to be carried out by application server 32 in the course of running instrumented code 30, at a code running step 60.

As explained above, instrumentation of the runtime code causes the processor 40 to store in cache 46 each input that is identified by a sensor during runtime as being potentially malicious, at an input caching step 62. Processor 40 also tests each output from the program flow, using the corresponding detector, to determine whether the target contains one of the cached inputs, at an output checking step 64. For practical reasons, inputs are held in the cache for only a certain, limited amount of time before being discarded, so that such outputs will be detected only within a certain time limit. When an output is found to match a cached input, processor 40 checks whether the target of the output is potentially vulnerable to attack by the cached input, at a vulnerability checking step 66. If so, processor 40 invokes protective action, at a protection step 68, which is described in greater detail hereinbelow. Otherwise, the processor concludes that the target is safe, and the application workflow proceeds without intervention.

Typically, the detectors that are associated with the program outputs check the cached inputs at step 64 not only for an exact match to the output, but also for approximate matches to the data contained in the output. For example, a soundex-type algorithm may be used to detect similarities between non-identical inputs and outputs. In this case, non-alphanumeric characters are removed from the original user input. If the output contains up to a certain number (for example, six) of non-alphanumeric characters between each two alphanumeric characters in the original input, the input and output are considered to match. The search for such similar instances may be carried out using regular expressions. This approach makes it possible to match the input to the output even if the input was changed by partial sanitization (with escape of certain characters, for example).

Upon finding a match, detectors that have been instrumented into the application may apply various tests to the output in order to identify attacks at step 66. Typically, some of these detection methods are based on construction and analysis of a document object model (DOM) of the output. For example, if a node that corresponds to an executable script in the DOM of the output is found to contain a user input, the detector will recognize the output as a potential attack.

As another example, in an embodiment of the present invention, the detector recognizes "DOM breaks," in which upon parsing of a given output, an input is found to be split between two (or more) nodes of the DOM. In general, a properly-composed input will occupy only a single DOM node at the output. This sort of "breakage" of the DOM is characteristic particularly of injection attacks, such as SQL or XSS injection. Upon detecting a DOM break, the detector will take action to prevent a possible attack. Identification and handling of DOM breaks is described hereinbelow with reference to FIG. 4.

Other tests are generally used at step 66 to detect file-path manipulation vulnerabilities. In an attack of this sort, the input cached by the sensor will typically contain at least one non-alphanumeric character that is not a dot. The targets of such attacks are methods that receive file paths as parameters and then perform reading, writing, and/or other changes based on the file paths.

The detector associated with such a method checks the corresponding file-path parameter against the cached inputs. If the target contains a cached input, the detector trims the input out of the target in order to get the path prefix (if it exists in the target). The detector may then convert the path to a canonical form in order to get the full, unique, absolute path. This conversion can be performed using methods that are known in the art, as provided, for example, by the C# methods known as Path.GetFullPath and HttpServer-Utility.MapPath that are available as part of the Microsoft .NET framework and are described on the msdn Web site.

If the canonical path does not contain the path prefix that was included in the target, the detector will recognize a possible attack at step 66, since the user input has apparently overridden the existing path prefix that was included in the target code and may thus gain access to a path that was not intended to be accessed by this output. In this case, the detector will typically raise an alert at step 68 regarding file-path manipulation and/or will take other preventive action.

For example, the (malicious) input: "..\Web.config" could be used in an attempt to gain access to the web.config file in the root application folder (accessed by ..), which should not be accessible to the user. The file path detector, however, will convert the ".." to its canonical form, with an explicit reference to the root folder, which was only a part of the original path prefix. Upon recognizing the file path mismatch, the detector will raise an alert.

Enhancing RASP Instrumentation Using SAST

As described above, the points at which a program should be instrumented for RASP, such as the input and output points that are instrumented in the two-point RASP approach described above, can be identified at step 50 (FIG. 2A) by recognizing the standard assembly code commands that correspond to inputs and outputs of the program. In some embodiments of the present invention, however, the precision and coverage of the RASP instrumentation is enhanced on the basis of prior SAST analysis of the program. Specifically, both the static code analysis carried out by a SAST tool and vulnerabilities in source code that are found by SAST may be applied in choosing points at which to apply RASP instrumentation.

Figure 3:
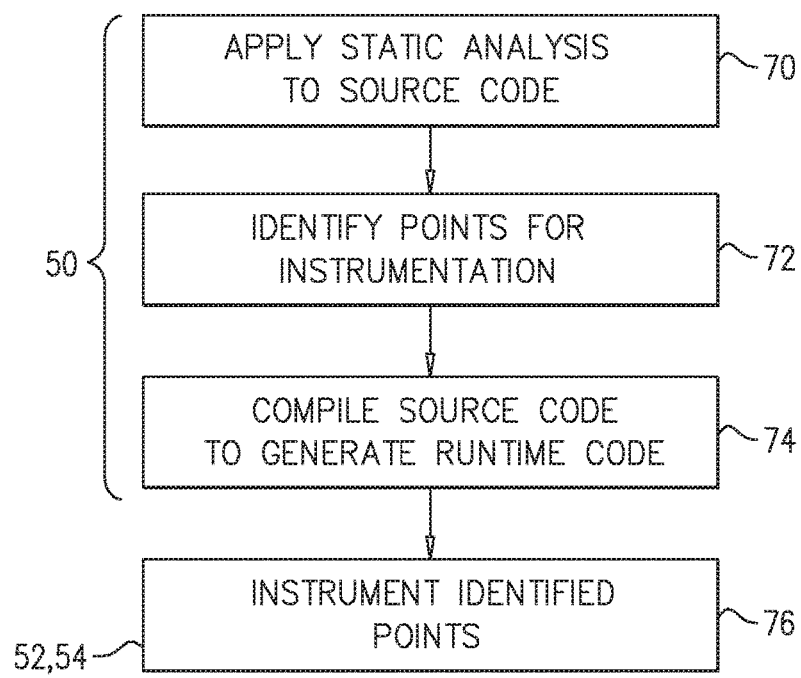
FIG. 3 is a flow chart that schematically shows details of a method for software code instrumentation, in accordance with an embodiment of the invention.

FIG. 3 is a flow chart that schematically shows details of input/output identification step 50, in accordance with an embodiment of the invention in which static analysis is used to enhance RASP instrumentation. For this purpose, instrumentation server 22 receives source code of the software application that is to be instrumented, instead of or in addition to runtime code 24.

Processor 26 applies static analysis to the source code, at a source code analysis step 70. Various tools that are known in the art can be used at this step. For example, PCT International Publication WO 2008/047351, whose disclosure is incorporated herein by reference, describes a static code analysis (SCA) engine that uses customizable queries, written in a code query language, to scan source code and extract results based on the DOM and the data and control flows of the code (using code flow and data flow graphs). An SCA engine of this sort is available commercially from Checkmarx Ltd. (Tel Aviv, Israel).

Based on the results of the static analysis, processor 40 identifies points in the code that should be instrumented, at an instrumentation point identification step 72. These points may include not only input and output points, as explained above, but also other types of instrumentation points, which are mentioned below. In terms of input and output points, these SAST-based techniques are useful, for example, in identifying non-standard APIs to be instrumented that were not known as part of the generic RASP configuration. In this context, SAST may identify both internal, proprietary APIs of particular programs and general points to instrument that are common and relevant for many applications, such as third-party APIs and other APIs that were not instrumented previously. The RASP system thus may gradually learn new points that should be instrumented in the assembly code in repeating instances of the API, and may also apply these points in subsequent analysis and protection of other programs.

After static analysis is completed and instrumentation points have been identified, the source code is compiled to generate runtime code, at a compilation step 74. RASP instrumentation can be added before compilation or, alternatively or additionally, points in the code to be instrumented can be marked for subsequent reference. In the latter case, the runtime code is instrumented at these points at an instrumentation step 76.

Using Static Code Analysis in Order to Extend the RASP Instrumentation Points List As noted above, processor 26 may identify, at step 72, points for RASP instrumentation that include not only input and output points, but also other types of instrumentation points. For example, the above-mentioned Checkmarx SCA engine supports the query "Find_DB", which returns a list of potential database (DB) access points in the application code, including standard DB access methods, third-party APIs, and internal propriety code. (The Checkmarx SCA engine has heuristics capable of finding non-standard DB APIs.) The SCA engine also provides facilities to customize this query (and others) for specific application needs in order to reach full coverage and return all DB access methods. The DB access points returned by the SCA may then be instrumented for RASP, such as applying the sort of DOM-break detection logic that is described above.

In a similar way, other queries (such as "Find_Inputs", "Find_Outputs", "Find_File_Path") may be submitted to the SCA Engine in order to find input and output points and points at which file paths are defined. The results of such queries include the corresponding method names and code context (file, line, column, code snippets and relevant DOM data), which identify locations in the code for RASP instrumentation. The results of "Find Inputs" queries can provide instrumentation points for RASP input sensors, while the results of "Find_Outputs" and "Find_File_Path" queries provide instrumentation points for RASP output (target) detectors. "Find_Outputs" results can be considered as potential XSS targets, for example, and "Find_File_Path" results can be considered as potential file path manipulation targets.

The above queries may be submitted to the SCA engine automatically by a RASP engine running on processor 26, which then converts the query results automatically into an instrumentation list. The above-mentioned "patcher" function of the RASP engine matches the method names and code context returned by the SCA queries to the method calls (with their names) and context as they appear in the application assembly code, and thus identifies the points for instrumentation in the assembly code.

Using Other SAST Results in Extending the RASP Instrumentation Points List

The above-mentioned PCT International Publication WO 2008/047351 also describes methods for scanning the source code of an application and returning a list of security vulnerabilities found in the code. SAST methods of this sort are implemented in products offered by Checkmarx Ltd., as well. The list of vulnerabilities can be viewed and exported as an automatically-generated report in various formats, including the relevant data for each vulnerability in the form of a "vector" indicating a potential attack source (including, but not limited to, the associated input points in the program under analysis) and ending with the attack target (such as an output point).

The RASP patcher running on processor 26 uses the attack vectors provided by the SAST tool at step 72 in identifying instrumentation points to add to the corresponding assembly code. Specifically, the list of vector attack sources provided by the SAST tool includes, like the query results described above, corresponding method names and code context. The RASP patcher uses this information in converting the list of attack source locations in the source code to a list of RASP instrumentation points, and associates RASP sensor logic with these points at step 76. By the same token, at step 76, the RASP patcher converts the list of vector attack targets to RASP instrumentation points with RASP detector logic. The vulnerability type reported in each case by the SAST results (such as SQL injection, XSS, or file path manipulation) indicates to the RASP patcher the type of detector logic that it should associate with each output point that it instruments. The RASP sensors and detectors that are thus applied to the input and output points in the runtime code as a result of the SAST-based instrumentation will detect not only instances of the particular vulnerabilities that were identified by the SAST analysis, but also other vulnerabilities on execution paths that were not detected by SAST.

As in the case of applying SCA queries to identify RASP instrumentation points, vulnerability-based RASP instrumentation using SAST results can be applied not only in instrumenting a specific application that has undergone SAST vulnerability analysis, but also in generating an enriched list of generic instrumentation points for improving RASP coverage in other programs, whether or not they have undergone a SAST scan.

"Three-Point" RASP Instrumentation

As noted earlier, runtime inputs to an application are frequently encoded, making it difficult to match these inputs to outputs in a two-point RASP scheme. To overcome this difficulty, in one embodiment of the present invention, SAST is used at step 72 to trace the flow of data from a given encoded input to the point in the program at which the input is decoded. RASP instrumentation is then added, at step 76, at this decoding point in the assembly code in order to capture the decoded input for subsequent matching to program outputs. The RASP logic is modified to add an input sensor at the decoding point, so that during runtime, the decoded input is cached at step 62 (FIG. 2B) and then compared to outputs detected by the RASP output instrumentation at step 66. This sort of instrumentation, including the intermediate decoding point, is referred to herein as "three-point RASP."

Alternatively, three-point RASP may be implemented without relying on SAST at all. Rather, the RASP patcher itself is programmed to recognize encoding and decoding points in the assembly code of a program, in addition to the input and output points identified at step 50 (FIG. 2A), and adds appropriate instrumentation at these encoding and decoding points. Intermediate decoding points may be instrumented with both a RASP detector, for detecting arrival of the encoded input, and a RASP sensor for caching of the decoded input to be used in subsequent processing by RASP output detectors.

DOM Breaks

As noted above, one of the techniques that can be applied by processor 40 at step 66 in detecting a possible attack is to parse outputs into a DOM and examine how the parsing is affected by inputs appearing in these outputs. Anomalous features appearing in the DOM can be indicative of an attack. In particular, at step 66, processor 40 recognizes "DOM breaks," in which upon parsing of a given output, an input is found to be split between two (or more) nodes of the DOM. The rationale for and application of DOM break detection will now be explained.

Many applications generate and interpret program statements during their execution. For example, when an application works with a database, it builds structured query language (SQL) statements, and the database interprets them during runtime. Another example is a Web application that generates hypertext markup language (HTML) commands, which are interpreted by a browser during runtime. Neither SQL nor HTML is compiled prior to runtime, and therefore both SQL queries and HTML commands can be manipulated during runtime. This characteristic of SQL, HTML and other interpreted languages forms the basis for many injection attacks, in which statements in such languages are changed during runtime by malicious user inputs. Attacks of this sort may include, for example, SQL injection, cross-site scripting (XSS), code injection, and log forging.

Injection attacks change the structure of a certain statement in a way that can lead to unwanted and dangerous application behavior. For example, a valid SQL statement might have the form:

SELECT * FROM Table WHERE User='Alex' wherein 'Alex' is a valid user input received by an application. If an attacker instead submits the input 'Alex or '1'='1'', the statement will then become:

SELECT * FROM Table WHERE User='Alex' or '1'='1'

The malicious user input changes the structure of the SQL statement by injecting the reserved word "or". This sort of statement can lead to a privilege escalation, whereby the malicious user is able to access all table records or even the entire database. Existing tools are capable of detecting injection attempts of this sort only if they are programmed in advance to recognize all valid structures for the given output and to identify deviations from these valid structures.

By contrast, in an embodiment of the present invention, processor 40 uses RASP instrumentation to detect injection attacks of this sort in runtime, at step 66, without intervention or code changes by programmers and without requiring prior knowledge about the code or advance definition of valid output patterns. This RASP approach can prevent SQL injection and other sorts of injection attacks in a running application by DOM-based analysis of program outputs. The RASP logic for performing the analysis may receive the relevant program inputs and output statements using any suitable sort of instrumentation, although the sort of two-point input and output instrumentation described above is particularly effective and efficient in this capacity. In the present example, the use of two-point RASP requires instrumenting only two points in the application: a first point where a user input is supplied, which is instrumented at step 52, and a second point where an SQL statement is output to a database, instrumented at step 54.

In the present example, processor 40 applies RASP logic at step 66 to identify SQL output statements that contain a user input and to parse each such SQL statement in runtime to yield a corresponding DOM. (Alternatively, other, equivalent sorts of parsing representations may be used.) After parsing a statement, if the input is a valid one, it will fall into only one leaf node of the DOM. If the input extends over more than a single leaf, it can be concluded that the SQL statement was changed and may be under SQL injection attack.

Figure 4:
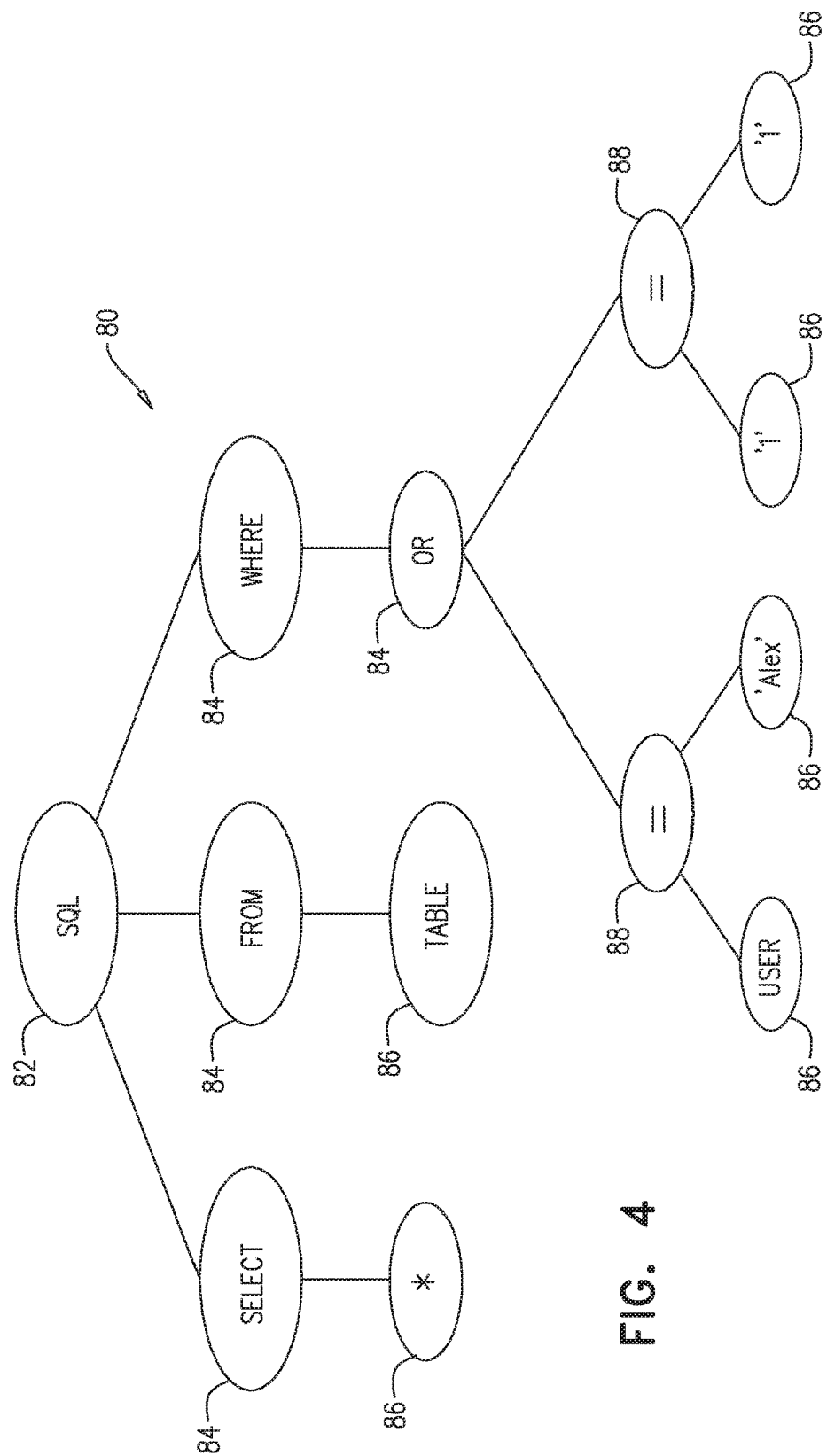
FIG. 4 is a graph that schematically illustrates a document object model (DOM) used in detection of a security vulnerability, in accordance with an embodiment of the invention.

FIG. 4 is a graph that schematically illustrates a DOM 80 that is used in detection of a security vulnerability, in accordance with an embodiment of the invention. DOM 80 is obtained by parsing the above statement: SELECT * FROM Table WHERE User='Alex' or '1'='1', in which the input 'Alex or '1'='1'' has been injected. DOM 80 comprises a root node 82 and intermediate nodes 84 corresponding to the operators in the statement. Leaves 86 correspond to the operands, including the input values 'Alex' and '1'='1' with equality operator nodes 88.

Whereas the valid input value 'Alex' appears in only one leaf 86, the malicious input '1'='1' is spread over a two leaves under WHERE node 84. This sort of occurrence, in which an input, cached at step 62, is found at step 66 to extend across multiple leaves 86 of the DOM, is referred to herein as a "DOM break." The RASP logic associated with the corresponding output (in this case, the SQL statement presented above) causes processor 40 to detect DOM breaks of this sort and to take the appropriate action at step 68 to inhibit the attack when a DOM break is detected.

Although the above example refers specifically to SQL injection, DOM-break detection can be used to detect other sorts of injection attacks, such as an HTML statement whose DOM structure is changed in order to carry out an XSS attack, a log record structure that has been changed in order to carry out log forging, or a file system attack based on changing a file path. In general, only two points of RASP instrumentation are needed in order to detect injections, and there is no need to define in advance the forms a valid structure may take, other than the criterion that a valid input will occupy only a single leaf of the DOM. The same methodology may also be applied, mutatis mutandis, in detecting attacks on script-language programs.

Preventive and Remedial Actions

Each detector may cause processor 40 at step 68 (FIG. 2B) to invoke various types of preventive actions upon detecting a potentially-malicious output that matches a cached input. At the lowest level, vulnerability events of this sort are logged and may thus be viewed by an operator of system 20 using terminal 48. Typically, the user interface presented on the terminal enables the operator both to visualize trends and to receive information about individual events. In addition, the operator may set the detectors to block inputs at step 68 in the case of severe vulnerabilities, so that the corresponding output will not proceed to the target at all, or to sanitize suspicious inputs before permitting the output to proceed. In this case, upon detecting a potential attack, processor 40 will not only log the suspicious event, but will also sanitize the input by removing malicious characters and adding escape codes, for example. This approach enables the application to maintain its normal workflow without interruption, and is useful particularly in cases in which the apparently-malicious input was merely the result of human error in typing the input.

Figure 5:
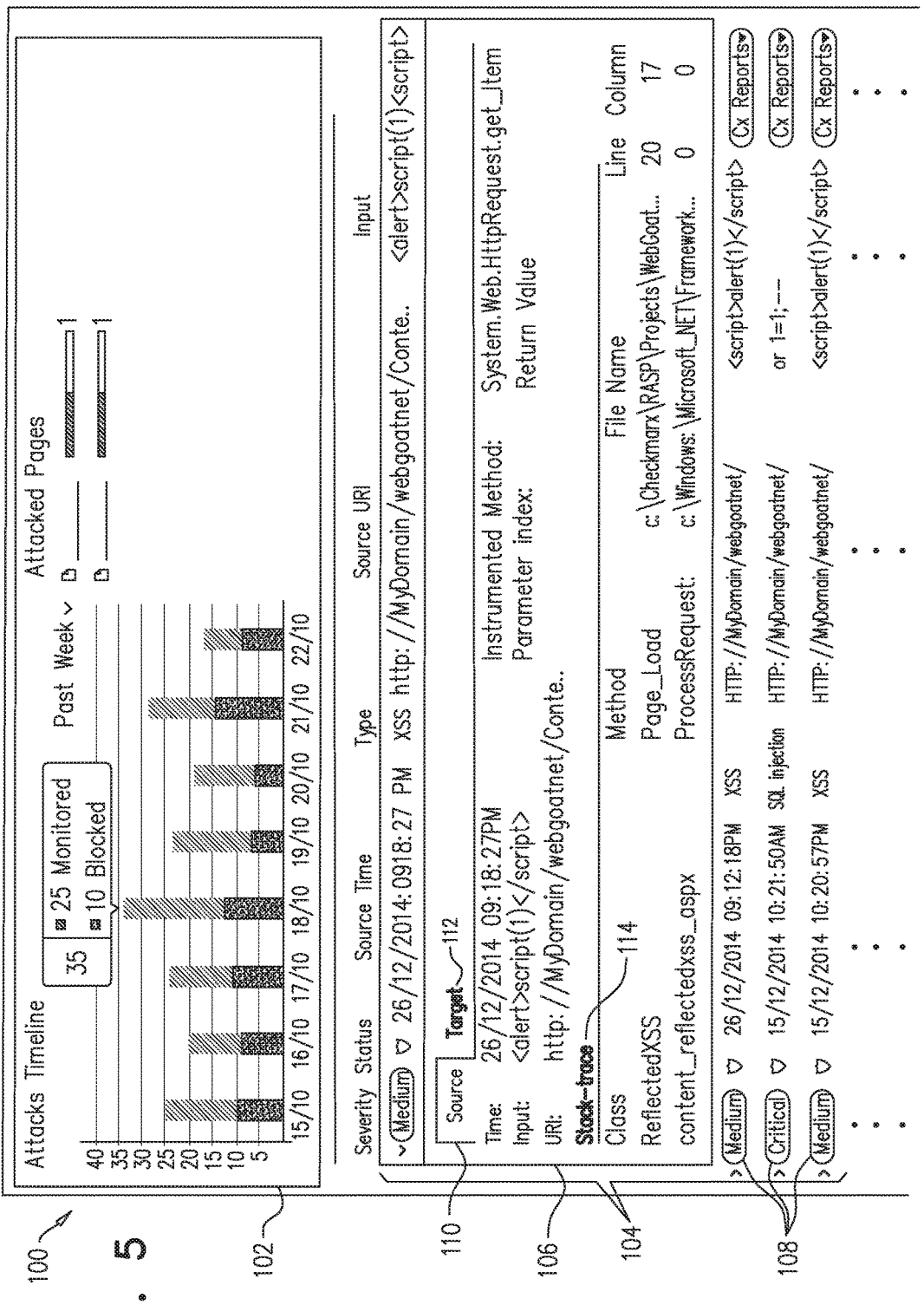
FIG. 5 is a schematic representation of a computer screen showing a vulnerability report, in accordance with an embodiment of the invention.

FIG. 5 is a schematic representation of a computer screen 100 showing a vulnerability report that is presented on terminal 48, in accordance with an embodiment of the invention. This report has the form of a user interface "dashboard," and includes both a trend window 102, showing daily trends regarding overall numbers of attacks detected and blocked, and an attack area 104 providing details of each alert 108. When the user selects one of the alerts, terminal 48 opens an alert window 106, which includes a source tab 110 and a target tab 112. Window 106 thus presents specific information regarding the attack source, such as input, time, methods and URI, and a full stack-trace 114, along with similar information for the attack target. Alert entries may also include the vulnerability type, severity, handling reaction (monitored or blocked), and optional links to other data, such as related SAST results.

When SAST information is also available—due to prior analysis of the application source code, for example— window 106 for each detected RASP event may include a link to the corresponding SAST information. In this case, code stack trace 114, as captured by the detector that discovered the attack, can be tied to the vulnerable source code itself, thus indicating the part of the source code that should be changed in order to prevent such attacks.

As another example of preventive action that can be initiated by or using system 20, the vulnerabilities detected by processor 40, along with the corresponding URIs and stack trace locations where they occur, may be used in automatically generating rules for implementation by a Web Application Firewall (WAF) that is associated with the application in question on server 32. SAST information may also be used, together with RASP, for this purpose. This RASP approach (possibly integrated with SAST) makes it possible to customize the WAF for the particular vulnerabilities of the application.

Enriching Other Testing and Protection Modalities Using RASP

Using RASP Instrumentation to Extract Program Flow Information for SAST

As noted earlier, there are many application behaviors that can be detected in runtime but are hard to analyze with a purely static approach using existing SAST tools. In an embodiment of the present invention, however, the SAST information is supplemented by adding RASP instrumentation to the executable code, and running the code thus instrumented in order to extract additional information, such as function call flow information. The instrumented code may be run in any suitable runtime environment.

In the present example of RASP-assisted SAST, the RASP logic generates a trace of program execution and records, for each method call in the trace, which method has been called and where it was called from. Running the RASP logic each time the original program has a call causes a record to be made of the caller and callee. These data are passed to the SAST tool, which can then incorporate the method call into the static analysis results.

Using RASP Results in Enhancing DAST

DAST tools automatically run penetration tests in order to find vulnerabilities. These tools, however, view the program under test as a "black box" and can therefore expose only vulnerabilities that are reflected to locations visible to the tool, such as the user output. Consequently, it is difficult or impossible for DAST to expose vulnerabilities that cause hidden damage (in a file system or DB, for example).

Applications protected by RASP can expose these hidden vulnerabilities, so that when the DAST tool runs its tests on an application program, the RASP tool will reflect the vulnerabilities by issuing error notifications or alerts. For example, RASP may detect an attempt to delete a file (by a file-system-related attack) or a hidden script in an SQL injection request.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

SAMPLE LOG FILE

<AlertLogEntry><AttackSource><Time>29/12/2014 03:20:09
PM</Time><Method>System.Web.HttpRequest.get_QueryString</Method><ParameterIndex>
0</ParameterIndex><CodePath
Uri="http://localhost/webgoat/Content/PathManipulation.aspx?filename=..\web.config"
Input="..\web.config"><PathNode><Class>PathManipulation</Class><Method>Page_Load</
Method><FileName>c:\Checkmarx\RASP\Projects\WebGoat.NET-master\WebGoat.NET-
master\WebGoat\Content\PathManipulation.aspx.cs</FileName><Line>33</Line><Column>11
</Column></PathNode><PathNode><Class>content_pathmanipulation_aspx</Class><Method
>ProcessRequest</Method><FileName>c:\Windows\Microsoft.NET\Framework\v2.0.50727\
Temporary ASP.NET
Files\webgoat\6900d940\a47ba2a5\App_Web_ktw6zjso.21.cs/FileName><Line>0</Line><Column
>0</Column></PathNode></CodePath></AttackSource><AttackTarget><Time>29/12/2014
03:20:09
PM</Time><Method>System.Web.UI.Page.MapPath</Method><ParameterIndex>1</Parameter
Index><CodePath
Uri="http://localhost/webgoat/Content/PathManipulation.aspx?filename=..\web.config"
Input="~/Downloads/..\web.config"><PathNode><Class>PathManipulation</Class><Method>
Page_Load</Method><FileName>c:\Checkmarx\RASP\Projects\WebGoat.NET-
master\WebGoat.NET-
master\Web Goat\Content\PathManipulation.aspx.cs</FileName><Line>38</Line><Column>25
</Column></PathNode><PathNode><Class>content_pathmanipulation_aspx</Class><Method
>ProcessRequest</Method><FileName>c:\Windows\Microsoft.NET\Framework\v2.0.50727\
Temporary ASP.NET
Files\webgoat\6900d940\a47ba2a5\App_Web_ktw6zjso.21.cs/FileName><Line>0</Line><Column
>0</Column></PathNode></CodePath></AttackTarget><Vulnerability>Path
Manipulation</Vulnerability><Severity>Medium</Severity><Status>Monitored</Status></Alert
LogEntry>
<AlertLogEntry><AttackSource><Time>29/12/2014 03:21:05
PM</Time><Method>System.Web.HttpRequest.get_Item</Method><ParameterIndex>0</Parameter
Index><CodePath
Uri="http://localhost/webgoat/Content/ReflectedXSS.aspx?city=&lt;Script&gt;alert(1)&lt;/script
&gt;"
Input="&lt;Script&gt;alert(1)&lt;/script&gt;"><PathNode><Class>ReflectedXSS</Class><Method
>Page_Load</Method><FileName>c:\Checkmarx\RASP\Projects\WebGoat.NET-
master\WebGoat.NET-
master\Web goat\Content\ReflectedXSS.aspx.cs</FileName><Line>21</Line><Column>17</
Column></PathNode><PathNode><Class>content_reflectedxss_aspx</Class><Method>Process
Request</Method><FileName>c:\Windows\Microsoft.NET\Framework\v2.0.50727\Temporary
ASP.NET
Files\webgoat\6900d940\a47ba2a5\App_Web_ktw6zjso.45.cs/FileName><Line>0</Line><Column
>0</Column></PathNode></CodePath></AttackSource><AttackTarget><Time>29/12/2014
03:21:05
PM</Time><Method>OUTPUT</Method><ParameterIndex>0</ParameterIndex><CodePath
Uri="http://localhost/webgoat/Content/ReflectedXSS.aspx?city=&lt;Script&gt;alert(1)&lt;/script
&gt;" Input="&lt;Script&gt;alert(1)&lt;/script&gt;"
/></AttackTarget><Vulnerability>XSS</Vulnerability><Severity>Medium</Severity><Status
>Monitored</Status></AlertLogEntry>
<AlertLogEntry><AttackSource><Time>29/12/2014 10:28:07
AM</Time><Method>System.Web.UI.WebControls.TextBox.get_Text</Method><ParameterIndex
>0</ParameterIndex><CodePath
Uri="http://localhost/webgoat/Content/SQLInjection.aspx" Input="' or 1=1 or
'"><PathNode><Class>SQLInjection</Class><Method>btnFind_Click</Method><FileName>
c:\Checkmarx\RASP\Projects\Webgoat.NET-master\WebGoat.NET-
master\Webgoat\Content\SQLInjection.aspx.cs</FileName><Line>25</Line><Column>13</
Column></PathNode><PathNode><Class>content_sqlinjection_aspx</Class><Method>Process
Request</Method><FileName>c:\Windows\Microsoft.NET\Framework\v2.0.50727\Temporary
ASP.NET
Files\webgoat\6900d940\a47ba2a5\App_Web_ljzklglj.38.cs/FileName><Line>0</Line><Column
>0</Column></PathNode></CodePath></AttackSource><AttackTarget><Time>29/12/2014
10:28:07
AM</Time><Method>System.Data.SQLite.SQLiteDataAdapter.ctor</Method><ParameterIndex
>1</ParameterIndex><CodePath Uri="http://localhost/webgoat/Content/SQLInjection.aspx"
Input="' or 1=1 or
'"><PathNode><Class>SqliteDbProvider</Class><Method>GetEmailByName</Method><File
Name>c:\Checkmarx\RASP\Projects\WebGoat.NET-master\WebGoat.NET-
master\WebGoat\App_Code\DB\SqliteDbProvider.cs</FileName><Line>485</Line><Column
>17</Column></PathNode><PathNode><Class>SQLInjection</Class><Method>btnFind_Click
</Method><FileName>c:\Checkmarx\RASP\Projects\WebGoat.NET-master\WebGoat.NET-
master\Web goat\Content\SQLInjection.aspx.cs</FileName><Line>26</Line><Column>13</

APPENDIX A-continued

SAMPLE LOG FILE

Column></PathNode><PathNode><Class>content_sqlinjection_aspx</Class><Method>Process Request</Method><FileName>c:\Windows\Microsoft.NET\Framework\v2.0.50727\Temporary ASP.NET Files\webgoat\6900d940\a47ba2a5\App_Web_ljzklglj.38.cs</FileName><Line>0</Line><Column>0</Column></PathNode></CodePath></AttackTarget><Vulnerability>SQL Injection</Vulnerability><Severity>Criticak/Severity><Status>Blocked</Status></AlertLogEntry>

APPENDIX B

XML LISTING OF INSTRUMENTATION METHODS

```xml
<?xml version="1.0"?>
-<RaspConfiguration>
    <Settings>c:\CX_RASP\Settings.xml</Settings>
    <InstrumentWebPages>TRUE</InstrumentWebPages>
    -<Inputs>
        -<Instrumentation>
            <Method>System.String System.Web.UI.WebControls.TextBox::get_Text( )</Method>
            <ParameterIndex>0</ParameterIndex>
        </Instrumentation>
        -<Instrumentation>
            <Method>System.String System.Windows.Forms.TextBox::get_Text( )</Method>
            <ParameterIndex>0</ParameterIndex>
                <!-- Optional for most of the instrumentations -->
            <Type>System.Windows.Forms.Control</Type>
        </Instrumentation>
        -<Instrumentation>
            <Method>System.String System.Web.HttpRequest::get_Item(System.String)
                </Method>
            <ParameterIndex>0</ParameterIndex>
        </Instrumentation>
        -<Instrumentation>
            <Method>System.Collections.Specialized.NameValueCollection System.Web.HttpRequest::get_QueryString( )
                </Method>
            <ParameterIndex>0</ParameterIndex>
        </Instrumentation>
            <!-- <Instrumentation> <Method> System.Collections.Specialized.NameValueCollection System.Web.HttpRequest::get_Form( )</Method>
            <ParameterIndex>0</ParameterIndex> </Instrumentation> -->
    </Inputs>
    -<Targets>
        -<Vulnerability Name="SQL Injection">
            -<Instrumentation>
                <Method>System.Void System.Data.OleDb.OleDbCommand::set_CommandText(System.String)
                    </Method>
                <ParameterIndex>1</ParameterIndex>
                    <!-- Optional for most of the instrumentations ->
                <Type>System.Data.Common.DbCommand</Type>
            </Instrumentation>
            -<Instrumentation>
                <Method>System.Void System.Data.OleDb.OleDbCommand::.ctor(System.String)
                    </Method>
                <ParameterIndex>1</ParameterIndex>
            </Instrumentation>
            -<Instrumentation>
                <Method>System.Void System.Data.OleDb.OleDbCommand::.ctor(System.String,System.Data.OleDb.OleDbConnection)
                    </Method>
                <ParameterIndex>1</ParameterIndex>
            </Instrumentation>
            -<Instrumentation>
                <Method>System.Void System.Data.OleDb.OleDbCommand::.ctor(System.String,System.Data.OleDb.OleDbConnection,System.-Data.OleDb.OleDbTransaction)
                    </Method>
                <ParameterIndex>1</ParameterIndex>
```

APPENDIX B-continued

XML LISTING OF INSTRUMENTATION METHODS

```
        </Instrumentation>
    -<Instrumentation>
            <Method>System.Void
            System.Data.SqlClient.SqlCommand::.ctor(System.String)
                </Method>
            <ParameterIndex>1</ParameterIndex>
        </Instrumentation>
    -<Instrumentation>
            <Method>System.Void
            System.Data.SqlClient.SqlCommand::.ctor(System.String,System.Data.SqlClient.SqlConnection)
                </Method>
            <ParameterIndex>1</ParameterIndex>
        </Instrumentation>
    -<Instrumentation>
            <Method>System.Void
            System.Data.SqlClient.SqlCommand::.ctor(System.String,System.Data.SqlClient.SqlConnection,System.-
            Data.SqlClient.SqlTransaction)
                </Method>
            <ParameterIndex>1</ParameterIndex>
        </Instrumentation>
    -<Instrumentation>
            <Method>System.Void
            System.Data.OleDb.OleDbDataAdapter::.ctor(System.String,System.String)
                </Method>
            <ParameterIndex>1</ParameterIndex>
        </Instrumentation>
    -<Instrumentation>
            <Method>System.Void
            System.Data.OleDb.OleDbDataAdapter::.ctor(System.String,System.Data.OleDb.OleDbConnection)
                </Method>
            <ParameterIndex>1</ParameterIndex>
        </Instrumentation>
    -<Instrumentation>
            <Method>System.Void
            System.Data.SQLite.SQLiteDataAdapter::.ctor(System.String,System.String)
                </Method>
            <ParameterIndex>1</ParameterIndex>
        </Instrumentation>
    -<Instrumentation>
            <Method>System.Void
            System.Data.SQLite.SQLiteDataAdapter::.ctor(System.String,System.Data.SQLite.SQLiteConnection)
                </Method>
            <ParameterIndex>1</ParameterIndex>
        </Instrumentation>
    -<Instrumentation>
            <Method>System.Void
            MySql.Data.MySqlClient.MySqlDataAdapter::.ctor(System.String,System.String)
                </Method>
            <ParameterIndex>1</ParameterIndex>
        </Instrumentation>
    -<Instrumentation>
            <Method>System.Void
            MySql.Data.MySqlClient.MySqlDataAdapter::.ctor(System.String,
            MySql.Data.MySqlClient.MySqlConnection)
                </Method>
            <ParameterIndex>1</ParameterIndex>
        </Instrumentation>
    -<Instrumentation>
            <Method>System.Void
            System.Data.SqlClient.SqlDataAdapter::.ctor(System.String,System.String)
                </Method>
            <ParameterIndex>1</ParameterIndex>
        </Instrumentation>
    -<Instrumentation>
            <Method>System.Void
            System.Data.SqlClient.SqlDataAdapter::.ctor(System.String,System.Data.SqlClient.SqlConnection)
                </Method>
            <ParameterIndex>1</ParameterIndex>
        </Instrumentation>
</Vulnerability>
-<Vulnerability Name="Path Manipulation">
    -<Instrumentation>
            <Method>System.String
            System.Web.UI.Page::MapPath(System.String)
                </Method>
            <ParameterIndex>1</ParameterIndex>
```

APPENDIX B-continued

XML LISTING OF INSTRUMENTATION METHODS

```
            </Instrumentation>
            -<Instrumentation>
                <Method>System.String
                    System.Web.HttpServerUtility::MapPath(System.String)
                        </Method>
                <ParameterIndex>1</ParameterIndex>
            </Instrumentation>
            -<Instrumentation>
                <Method>System.Void System.IO.FileInfo::.ctor(System.String)
                        </Method>
                <ParameterIndex>1</ParameterIndex>
            </Instrumentation>
            -<Instrumentation>
                <Method>System.Void
                    System.IO.DirectoryInfo::.ctor(System.String)
                        </Method>
                <ParameterIndex>1</ParameterIndex>
            </Instrumentation>
        </Vulnerability>
    </Targets>
</RaspConfiguration>
```

The invention claimed is:

1. A method for runtime self-protection of an application program, comprising:

before running the application program:
  identifying input and output points in runtime code of the program;
  instrumenting the input points so as to cause the program to sense and cache potentially malicious inputs to the program; and
  instrumenting the output points so as to cause the program to detect outputs from the program corresponding to the cached inputs; and while running the application program:
  upon detecting, at an instrumented output point, an output corresponding to a cached input, evaluating a vulnerability of a target of the output to the cached input; and
  invoking a protective action upon determining that the output is potentially vulnerable to the cached input.

2. The method according to claim 1, wherein instrumenting the input points comprises adding a sensor routine to each identified input point, wherein the sensor routine examines the input for syntax that is characteristic of an attack pattern.

3. The method according to claim 2, wherein the attack pattern is selected from a set of attack patterns consisting of SQL injection, cross-site scripting (XSS), file path manipulation, and JavaScript Object Notation (JSON) injection.

4. The method according to claim 1, wherein identifying the output points comprises identifying instructions submitted by the application program to a predefined set of targets.

5. The method according to claim 4, wherein the set of targets comprises at least one target type selected from a group of target types consisting of databases, file systems and markup language outputs of Web applications.

6. The method according to claim 1, wherein identifying the input and output points comprises applying a static analysis to source code of the program in order to identify one or more of the input and output points.

7. The method according to claim 1, wherein identifying the input points comprises identifying an encoded input to the application program, and wherein the method comprises identifying and instrumenting a decoding point in the runtime code, at which the encoded input is decoded, so as to cause the program to cache the decoded input for detection of the outputs corresponding thereto.

8. The method according to claim 1, wherein instrumenting the input and output points comprises replacing input and output methods in the runtime code with a general method RASP proxy, which wraps the methods.

9. The method according to claim 1, wherein detecting the output comprises finding an approximate match between the cached input and data contained in the output.

10. The method according to claim 1, wherein detecting the output comprises detecting a file-path parameter in the cached input, and wherein evaluating the vulnerability comprises converting the file-path parameter to a canonical form, and identifying a file system vulnerability when the canonical form does not match a file-path prefix of the output.

11. The method according to claim 1, wherein evaluating the vulnerability comprises parsing the output into a document object model (DOM), and examining an effect of the cached input on the DOM.

12. The method according to claim 11, wherein examining the effect comprises determining that the output is potentially vulnerable when the cached input extends over more than a single leaf of the DOM.

13. The method according to claim 11, wherein examining the effect comprises detecting an executable script in the DOM that contains the cached input.

14. The method according to claim 1, and comprising, upon determining that the output is not vulnerable to the cached input, taking no protective action.

15. The method according to claim 1, wherein invoking the protective action comprises sanitizing the cached input before permitting the output to proceed.

16. The method according to claim 1, wherein invoking the protective action comprises reporting the vulnerability to a user together with a stack trace associated with at least one of the cached input and the detected output.

17. The method according to claim 1, wherein invoking the protective action comprises identifying a portion of the source code corresponding to the output that was determined to be potentially vulnerable.

18. The method according to claim 1, wherein invoking the protective action comprises automatically generating rules for implementation by a Web Application Firewall (WAF).

19. Apparatus for runtime self-protection of an application program, comprising:
   a memory, which is configured to receive runtime code of the program; and
   a processor, which is configured to identify, before the program is run, input and output points in the runtime code, to instrument the input points so as to cause the program, while the program is running, to sense and cache potentially malicious inputs to the program, and to instrument the output points with instrumentation that causes the program, while the program is running, to detect outputs from the program corresponding to the cached inputs, and upon detecting an output corresponding to a cached input, to evaluate a vulnerability of a target of the output to the cached input and to invoke protective action upon determining that the output is potentially vulnerable to the cached input.

20. The apparatus according to claim 19, wherein the processor is configured to instrument the input points by adding a sensor routine to each identified input point, wherein the sensor routine examines the input for syntax that is characteristic of an attack pattern.

21. The apparatus according to claim 20, wherein the attack pattern is selected from a set of attack patterns consisting of SQL injection, cross-site scripting (XSS), file path manipulation, and JavaScript Object Notation (JSON) injection.

22. The apparatus according to claim 19, wherein the identified output points comprises instructions submitted by the application program to a predefined set of targets.

23. The apparatus according to claim 22, wherein the set of targets comprises at least one target type selected from a group of target types consisting of databases, file systems and markup language outputs of Web applications.

24. The apparatus according to claim 19, wherein the processor is configured to apply a static analysis to source code of the program in order to identify one or more of the input and output points.

25. The apparatus according to claim 19, wherein the processor is configured to identify an encoded input to the application program, and to identify and instrument a decoding point in the runtime code, at which the encoded input is decoded, so as to cause the program to cache the decoded input for detection of the outputs corresponding thereto.

26. The apparatus according to claim 19, wherein the processor is configured to replace input and output methods in the runtime code with a general method RASP proxy, which wraps the methods.

27. The apparatus according to claim 19, wherein the instrumentation causes the program to find an approximate match between the cached input and data contained in the output.

28. The apparatus according to claim 19, wherein the instrumentation causes the program to detect a file-path parameter in the cached input, to convert the file-path parameter to a canonical form, and to identify a file system vulnerability when the canonical form does not match a file-path prefix of the output.

29. The apparatus according to claim 19, wherein the instrumentation causes the program to parse the output into a document object model (DOM), and to examine an effect of the cached input on the DOM.

30. The apparatus according to claim 29, wherein the instrumentation causes the program to determine that the output is potentially vulnerable when the cached input extends over more than a single leaf of the DOM.

31. The apparatus according to claim 29, wherein the instrumentation causes the program to detect an executable script in the DOM that contains the cached input.

32. The apparatus according to claim 19, wherein the instrumentation causes the program to take no protective action upon determining that the output is not vulnerable to the cached input.

33. The apparatus according to claim 19, wherein the protective action comprises sanitizing the cached input before permitting the output to proceed.

34. The apparatus according to claim 19, wherein the protective action comprises reporting the vulnerability to a user together with a stack trace associated with at least one of the cached input and the detected output.

35. The apparatus according to claim 19, wherein the protective action comprises identifying a portion of the source code corresponding to the output that was determined to be potentially vulnerable.

36. The apparatus according to claim 19, wherein the protective action comprises automatically generating rules for implementation by a Web Application Firewall (WAF).

37. A computer software product for runtime self-protection of an application program, comprising a non-transitory computer-readable medium in which program instructions are stored, which instructions, when read by a computer, cause the computer to receive runtime code of the program, and to identify, before the program is run, input and output points in the runtime code, and to instrument the input points so as to cause the program, while the program is running, to sense and cache potentially malicious inputs to the program, and to instrument the output points with instrumentation that causes the program, while the program is running, to detect outputs from the program corresponding to the cached inputs, and causes the program, upon detecting an output corresponding to a cached input, to evaluate a vulnerability of a target of the output to the cached input and to invoke protective action upon determining that the output is potentially vulnerable to the cached input.

* * * * *